United States Patent [19]
Breault

[11] 3,972,735
[45] Aug. 3, 1976

[54] METHOD FOR MAKING ELECTRODES FOR ELECTROCHEMICAL CELLS

[75] Inventor: Richard D. Breault, Coventry, Conn.

[73] Assignee: United Technologies Corporation, Hartford, Conn.

[22] Filed: Apr. 4, 1975

[21] Appl. No.: 565,179

Related U.S. Application Data

[60] Continuation-in-part of Ser. No. 442,961, Feb. 15, 1974, abandoned, which is a division of Ser. No. 268,258, July 3, 1972, abandoned, which is a continuation-in-part of Ser. No. 98,934, Dec. 16, 1970, abandoned.

[52] U.S. Cl. .............................................. 136/122
[51] Int. Cl.² ........................................ H01M 13/02
[58] Field of Search ............................ 136/121–122, 136/120 FC, 86 D; 423/447, 460; 204/294; 162/152, 138; 427/249, 402, 407; 264/127, 331

[56] References Cited
UNITED STATES PATENTS

| | | | |
|---|---|---|---|
| 3,258,363 | 6/1966 | Lieb | 136/121 X |
| 3,297,482 | 1/1967 | Zimmer | 136/121 |
| 3,322,576 | 5/1967 | Young | 136/121 |
| 3,369,920 | 2/1968 | Bourdeau et al. | 117/46 |
| 3,619,286 | 11/1971 | Gutnajer | 117/226 |
| 3,829,327 | 8/1974 | Omori et al. | 136/122 X |

FOREIGN PATENTS OR APPLICATIONS

| | | | |
|---|---|---|---|
| 1,158,580 | 7/1969 | United Kingdom | 136/120 FC |

*Primary Examiner*—Anthony Skapars
*Attorney, Agent, or Firm*—Stephen E. Revis

[57] ABSTRACT

A novel method for making an electrode for use in an electrochemical cell comprises forming a substrate by coating the fibers of a fibrous carbon paper with pyrolytic carbon, wet proofing the coated paper with a hydrophobic polymer, sintering the wet proofed paper, and applying a catalyst/hydrophobic polymer layer thereon.

5 Claims, No Drawings

METHOD FOR MAKING ELECTRODES FOR ELECTROCHEMICAL CELLS

CROSS-REFERENCE TO RELATED APPLICATIONS

This application is a continuation-in-part of application Ser. No. 442,961 filed Feb. 15, 1974, now abandoned, which is a division of application Ser. No. 268,258, filed on July 3, 1972, now abandoned, which in turn is a continuation-in-part application of application Ser. No. 98,934 filed Dec. 16, 1970, now abandoned, all of which are assigned to the same assignee as the instant application.

BACKGROUND OF THE INVENTION

1. Field of the Invention

This invention relates to fuel cells and more particularly to an improved fuel cell electrode.

2. Description of the Prior Art

Electrodes known in the art generally utilize metal screens as supports. The metal screens, such as tantalum screen, are very expensive and often have undesirable mechanical properties; e.g., anodes utilizing metal screens suffer a degradation of performance with time because the metal screen deteriorates due to hydrogen embrittlement, often to a point where the screen may be crumbled. Furthermore, the metal screen does not have a smooth surface, thus requiring a high catalyst loading during fabrication of the electrode. Other electrodes known in the art, especially of the fabric or paper type (which are generally backed by metal screens for support), utilize a low percentage by weight of a waterproofing agent — a low percentage must be used in order to keep the electrical resistivity low — and thereby become wetted during an extended period of operation thus suffering a decrease in performance. The present invention obviates these undesirable features.

SUMMARY OF THE INVENTION

It is an object of the present invention to provide an improved electrochemical cell carbon paper-type electrode having a low catalyst loading, improved oxidation resistance, improved electrical and thermal conductivity and improved resistance to wetting with time, as compared with carbon paper fuel cell electrodes known heretofore.

In accordance with the present invention, an improved carbon paper-type fuel cell electrode which attains the above and other objects and advantages is provided by a carbon paper comprising carbon fibers coated with a pyrolytic carbon; the paper is then impregnated with a hydrophobic polymer dispersion, dried and sintered. After sintering, a catalyst-hydrophobic polymer layer is applied to the treated carbon paper (substrate) by any one of several known techniques, such as spraying or the filtration-transfer technique, for example.

The two features of the present invention which are responsible for the improved electrode are the pyrolytic carbon coating and the fact that the coated carbon paper may be impregnated with a dispersion containing a relatively high weight percentage of hydrophobic polymer, such as polytetrafluoroethylene, for example, and still retain high electrical conductivity.

The pyrolyzing process not only coats the individual fibers, but locks one to the other, thereby ensuring good electrical conductivity through the carbon paper substrate. Because the fibers are locked together there is no possibility of adversely affecting the electrical properties during electrode fabrication (i.e., no chance that the hydrophobic polymer, even in large amounts, could encapsulate the fibers during the wet-proofing operation and destroy the good electrical conductivity). Paper not so coated, and therefore not so bonded together, has high electrical resistance after being impregnated with a hydrophobic polymer, whereas the pyrolytic carbon coated paper has very low electrical resistance after being impregnated on the order of about 0.02 to 0.05 ohm-cm (measured in the plane of the paper).

Impregnation of the pyrolytic carbon coated carbon paper with a hydrophobic polymer produces an electrode substrate which will remain hydrophobic with extended periods of operation and one which has sufficient mechanical and electrical properties such that it does not have to be backed with a metal screen. Preferably the substrate should contain 5–40% hydrophobic polymer.

The relatively smooth surface of the polymer impregnated pyrolytic carbon coated carbon paper allows an electrode to be fabricated with very low catalyst loadings.

The foregoing and other objects, features and advantages of the present invention will become more apparent in light of the following detailed description of a preferred embodiment thereof.

DESCRIPTION OF THE PREFERRED EMBODIMENT

A fuel cell electrode according to the present invention may be prepared as follows:

A carbon paper substrate is made, for example, by carbonizing a fiber such as nylon or rayon by heating at about 1300° to 1500°F. These carbonized fibers may then be cut to the desired length and made into paper by any one of the well-known paper-making processes. Carbon paper coated with pyrolytic carbon is commercially available from various manufacturers, such as the Union Carbide Company and Kreha Corporation, for example. A pyrolytic carbon coating is then deposited onto the carbon fibers by gas deposition of graphite onto the carbon paper. The gas deposition is accomplished by "cracking" the methane molecule ($CH_4$) at high temperatures (about 1350°F, for example) in the absence of air, burning off the unwanted hydrogen and depositing the carbon atoms (in the form of an extremely well ordered crystal system) onto the paper substrate. The above description is illustrative of a method of making a pyrolytic carbon coated carbon paper only, and does not form part of the invention per se. The coated carbon paper is then impregnated with a hydrophobic polymer (preferably a hydrophobic fluorocarbon polymer), such as polytetrafluoroethylene (Dupont Co.'s TFE-30, for example) or perfluorinated ethylene propylene copolymer (DuPont Co.'s FEP-120, for example), by, for example, immersion in a dispersion of the polymer in water with a surfactant. The water in the dispersion may then be evaporated off the paper by heating at 150°–200°F for about 1 hour, if desired. An electrode having good performance characteristics will result if the polymer content of the impregnated coated carbon paper is in the range of 5 to 40% by weight. If the polymer is polytetrafluoroethylene then the impregnated paper is then sintered at about 580°–630°F for about 5 minutes. After sintering, a catalyst-polymer layer, such as 2 mg/cm$^2$ of 32 weight percent Pt, 32 weight percent Ph, 16 weight percent $WO_3$ and 20 weight percent Teflon for an anode, or such as 4 mg/cm$^2$ of 75 weight percent Pt and 25 weight percent Teflon for a cathode, may be applied to the sintered, pyrolytic carbon coated, polymer impregnated carbon paper by any of the known techniques, such as spraying or the filtration-transfer technique, for example.

An electrode (either an anode or cathode electrode) prepared in the foregoing manner is typically spaced from another electrode (which may or may not be of the same construction) to form an electrolyte compartment therebetween. Plates or other well-known means are constructed and arranged with each electrode to define a reactant gas passage on the nonelectrolyte side of each electrode.

Another catalyst-polymer layer which may be advantageously employed in an oxygen electrode is ¼ mg/cm$^2$ of catalyst comprising platinum supported on graphite in the ratio of 5% platinum and 95% graphite, by weight. This catalyst is mixed with polytetrafluoroethylene in the proportions of 45 to 55% polytetrafluoroethylene and 55 to 45% catalyst by weight of the catalyst-polymer layer and applied to the carbon paper as described above. A corresponding catalyst-polymer layer which has been found to have good characteristics in a hydrogen electrode is ¼ mg/cm$^2$ of catalyst comprising platinum supported on graphite with tungsten oxide in the proportions of 5% platinum, 47½% graphite and 47½% tungsten oxide, by weight. This catalyst is also mixed with polytetrafluoroethylene in the proportions of 20 to 35% polytetrafluoroethylene and 80 to 65% catalyst by weight of the catalyst-polymer layer and applied to the carbon paper by any of the known techniques such as described above. Electrodes of pyrolytic carbon coated, polytetrafluoroethylene impregnated carbon paper about 10 to 20 mils thick and about 70% porous made according to the above process were tested in a fuel cell utilizing 96% phosphoric acid as the electrolyte at 325°F and one atmosphere pressure; the anode catalyst was ¼ mg/cm$^2$ platinum supported on graphite with tungsten oxide as described above, and the cathode catalyst was ¼ mg/cm$^2$ of platinum supported on graphite as described above. Typical performances are as follows:

| Fuel | Oxidant | Volts Produced At 100 Amps/ft$^2$ | 200 Amps/ft$^2$ | 300 Amps/ft$^2$ |
| --- | --- | --- | --- | --- |
| hydrogen | oxygen | 0.734 volts | 0.668 volts | 0.618 volts |
| hydrogen | air | 0.657 volts | 0.580 volts | 0.518 volts |
| reformed natural gas | air | 0.643 volts | 0.564 volts | 0.498 volts |

Furthermore, in addition to the good performance shown above, electrodes made according to the present invention result in electrodes with low gas diffusional losses compared to other state-of-the-art carbon electrodes. This can be shown by the high air limiting currents for the cathode, and high hydrogen limiting currents for the anode, described heretofore. The air limiting currents for the cathode having ¼ mg/cm$^2$ of platinum catalyst supported on graphite made according to the present invention are about 1500 to 2000 amps per square foot (ASF), and the hydrogen limiting currents for the anode having a catalyst loading of ¼ mg/cm$^2$ of tungsten oxide plus platinum supported on graphite made according to the present invention are 7,500 to 10,000 ASF, whereas the air limiting currents for a carbon cathode known in the art are less than 1000 ASF and the hydrogen limiting currents for a carbon anode known in the art are less than 6000 ASF.

It will be understood by those skilled in the art that any type catalyst known in the art may be applied with a polymer to the treated carbon paper and that the catalyst given here by way of example are only some of the many possible for use therewith.

There has thus been described a preferred embodiment of a pyrolytic carbon coated, hydrophobic polymer impregnated carbon paper electrode in accordance with the present invention. It will be obvious to those skilled in the art that various changes and omissions in the form, method and detail thereof may be made therein without departing from the spirit and scope of the invention.

What is claimed as new and desired to be secured by Letters Patent of the United States is:

1. A method for making an electrode for an electrochemical cell, comprising:
    forming a substrate including the step of coating the fibers of a fibrous carbon paper with pyrolytic carbon wherein said pyrolytic carbon forms electrically conductive bonds between said fibers, wet proofing said coated paper by impregnating said paper with a hydrophobic polymer, and sintering the impregnated paper at a temperature of about 580° to 630°F; and
    applying a layer to the sintered paper consisting of a catalyst and a hydrophobic polymer.

2. The method for making an electrode as defined in claim 1, wherein said step of impregnating the coated paper with a hydrophobic polymer includes impregnating the coated paper with 5 to 40% by weight hydrophobic polymer.

3. The method for making an electrode as defined in claim 1 wherein said step of impregnating said coated paper with a hydrophobic polymer includes impregnating said coated paper with polytetrafluoroethylene.

4. The method for making an electrode as defined in claim 1 wherein the step of impregnating said coated paper with a hydrophobic polymer comprises impregnating said coated paper with a hydrophobic fluorocarbon polymer.

5. A method for making an electrode for an electrochemical cell, comprising:
    forming a substrate including the steps of coating the fibers of a fibrous carbon paper with pyrolytic carbon wherein said pyrolytic carbon forms electrically conductive bonds between said fibers, wet proofing said coated paper by impregnating said paper with 5 to 40% by weight polytetrafluoroethylene, and sintering the impregnated paper at a temperature of about 580° to 630°F; and
    applying a layer to the sintered paper consisting essentially of a catalyst and polytetrafluoroethylene.

* * * * *